(12) United States Patent
Jin et al.

(10) Patent No.: US 7,649,677 B2
(45) Date of Patent: Jan. 19, 2010

(54) MULTI-RIDGED SUBWAVELENGTH APERTURE FOR OPTICAL TRANSMISSION AND THERMALLY ASSISTED MAGNETIC RECORDING

(75) Inventors: Xuhui Jin, West Lafayette, IN (US); Chie Ching Poon, San Jose, CA (US); Timothy Carl Strand, San Jose, CA (US); Henry Hung Yang, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 672 days.

(21) Appl. No.: 11/398,170

(22) Filed: Apr. 4, 2006

(65) Prior Publication Data
US 2007/0230010 A1 Oct. 4, 2007

(51) Int. Cl.
G02F 2/00 (2006.01)
G11B 19/02 (2006.01)
G02B 6/10 (2006.01)
G02B 6/12 (2006.01)

(52) U.S. Cl. ............... 359/325; 385/14; 385/129; 385/132; 360/119.08; 360/125.39; 369/13.02

(58) Field of Classification Search ............ 385/14, 385/129–132; 359/325; 372/95; 360/69, 360/119.08, 125.39, 126; 369/13.02
See application file for complete search history.

(56) References Cited

U.S. PATENT DOCUMENTS

| | | | |
|---|---|---|---|
| 5,726,805 A * | 3/1998 | Kaushik et al. | 359/589 |
| 5,835,458 A | 11/1998 | Bischel et al. | |
| 5,878,070 A | 3/1999 | Ho et al. | |
| 6,714,370 B2 | 3/2004 | McDaniel et al. | |
| 6,768,556 B1 | 7/2004 | Matsumoto et al. | |
| 6,795,380 B2 | 9/2004 | Akiyama et al. | |
| 6,944,101 B2 | 9/2005 | Johns et al. | 369/13.13 |
| 6,975,580 B2 * | 12/2005 | Rettner et al. | 369/300 |
| 7,095,767 B1 * | 8/2006 | Thornton et al. | 372/45.01 |
| 7,236,332 B2 * | 6/2007 | Stipe | 360/317 |

(Continued)

FOREIGN PATENT DOCUMENTS

JP 2001326420 11/2001

(Continued)

OTHER PUBLICATIONS

R.W. Boyd, et al., "Nanofabrication of optical structures and devices for photonics and biophotonics", Journal of Modern Optics 2003, vol. 50, No. 15-17, 2543-2550.

(Continued)

*Primary Examiner*—Uyen-Chau N Le
*Assistant Examiner*—Daniel Petkovsek
(74) *Attorney, Agent, or Firm*—Zilka-Kotab, PC

(57) ABSTRACT

A subwavelength aperture includes a plurality of ridges that project from an aperture sidewall into the aperture opening. The ridges may be closely spaced such that the hot spots associated with the ridges are likewise closely spaced and create an elongated hot spot. The subwavelength aperture of the present invention may be adapted for use in a magnetic head of a hard disk drive for improved thermally assisted recording (TAR) of magnetic data bits. Such a magnetic head may include an optical resonant cavity that is fabricated within the magnetic head structure.

36 Claims, 5 Drawing Sheets

U.S. PATENT DOCUMENTS

| | | | |
|---|---|---|---|
| 7,272,102 B2 * | 9/2007 | Challener | 369/112.27 |
| 2002/0080842 A1 | 6/2002 | An et al. | |
| 2003/0123335 A1 | 7/2003 | Rettner et al. | |
| 2003/0137772 A1 | 7/2003 | Challener | |
| 2003/0184903 A1 | 10/2003 | Challener | |
| 2003/0198146 A1 | 10/2003 | Rottmayer et al. | |
| 2004/0008591 A1 | 1/2004 | Johns et al. | 369/13.14 |
| 2004/0062152 A1 | 4/2004 | Stancil et al. | |
| 2004/0062503 A1 | 4/2004 | Challener | |
| 2005/0254355 A1 * | 11/2005 | Rettner et al. | 369/13.24 |

FOREIGN PATENT DOCUMENTS

| | | |
|---|---|---|
| JP | 2001351277 | 12/2001 |
| JP | 2002133608 | 5/2002 |
| JP | 2003006803 | 1/2003 |
| JP | 2004061360 | 2/2004 |

OTHER PUBLICATIONS

Mode Characteristics of a Multiridge Rectangular Waveguide by Zhongxian Shen et al., Microwave and Optical Technology Letters, vol. 26, No. 5, Sep. 5, 2000.

Detection Signal-to-Noise Ratio Versus Bit Cell Aspect Ratio at High Areal Densities by Jinghuan Chen et al., IEEE Transactions on Magnetics, vol. 37, No. 3, May 2001.

Light Delivery Techniques for Heat-Assisted Magnetic Recording by William A. Challener et al., published Sep. 28, 2002.

Issues in Heat-Assisted Perpendicular Recording by Terry W. McDaniel et al.; IEEE Transactions on Magnetics, vol. 39, No. 4, Jul. 2003.

Optical Microcavities by Kerry J. Vahala, Nature, vol. 424, Aug. 14, 2003.

Design of a C aperture to achieve A/10 resolution and resonant transmission by Xiaolei Shi et al., Optical Society of America, vol. 21, No. 7, Jul. 2004.

Ridge waveguide as a near field aperture for high density data storage by Kursat Sendur et al., Journal of Applied Physics, vol. 96, No. 5, Sep. 1, 2004.

Boyd et al., "Nanofabrication of optical structures and devices for photonics and biophotonics" Journal of Modern Optics, 2003, vol. 50, No. 15-17, 2543-2550.

* cited by examiner

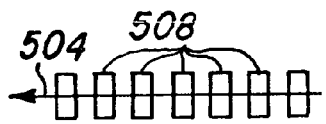
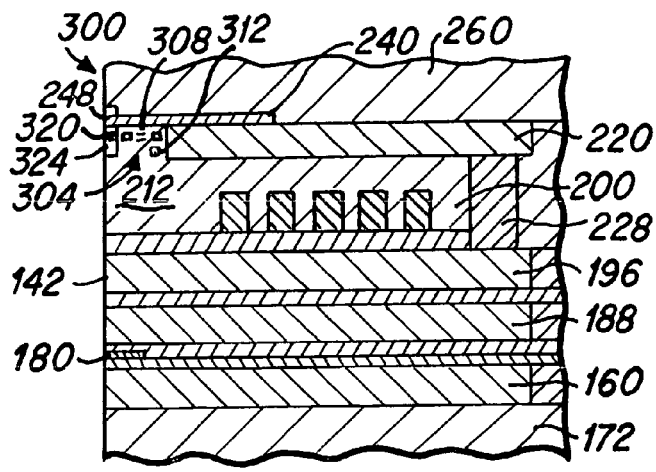
Fig.13
Fig.14A
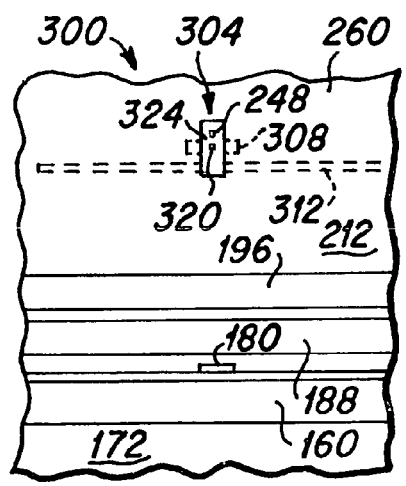
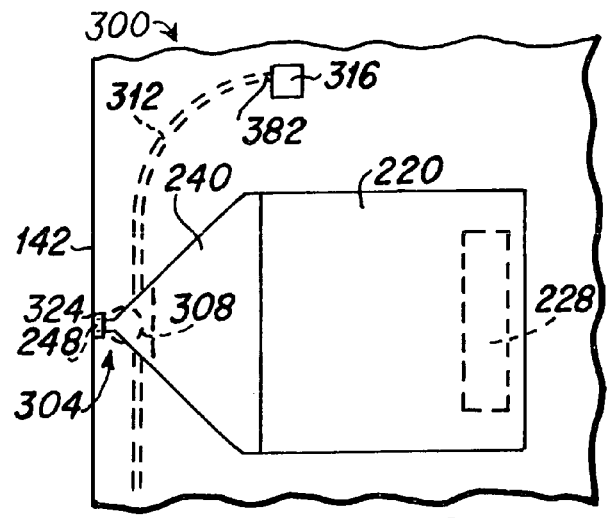
Fig.14B
Fig.14C
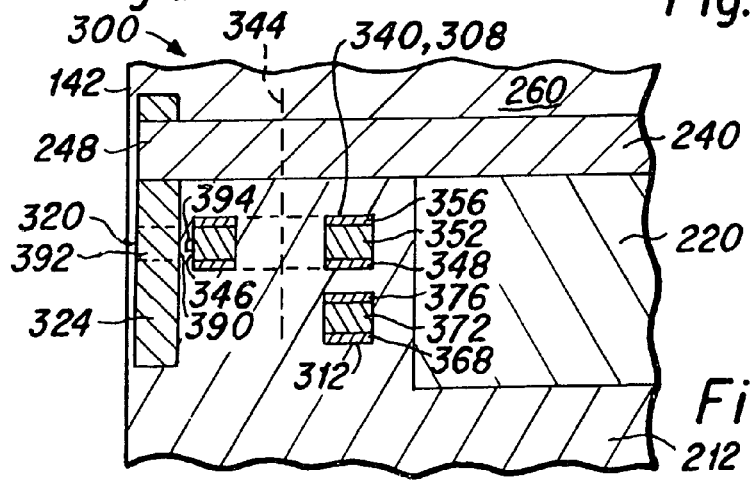
Fig.14D

MULTI-RIDGED SUBWAVELENGTH APERTURE FOR OPTICAL TRANSMISSION AND THERMALLY ASSISTED MAGNETIC RECORDING

BACKGROUND OF THE INVENTION

1. Field of the Invention

The present invention relates generally to subwavelength apertures for light transmission, and more particularly to a multi-ridged subwavelength aperture and a magnetic head having a media heating device including a coupled multi-ridged subwavelength aperture.

2. Description of the Prior Art

Subwavelength apertures are known for the transmission of optical energy, where the shape of the aperture significantly affects the properties of optical energy that passes through the apertures. Here, we refer to subwavelength apertures as a class of optical apertures which have dimensions generally less than that of the wavelength of light they transmit. One such well known subwavelength aperture is a C-shaped aperture in which optical energy that passes through it creates a single, approximately round hot spot in the near field away from the aperture. Such a subwavelength aperture can have applications in hard disk drive devices that employ thermally assisted recording of magnetic data bits onto magnetic hard disk media.

Hard disk drives generally include one or more rotatable data storage disks having a magnetic data storage layer formed thereon. Data in the form of small magnetized areas, termed magnetic data bits, are written onto the magnetic layers of the disks by a magnetic head that includes magnetic poles through which magnetic flux is caused to flow. Magnetic flux flowing from a pole tip portion of the magnetic poles in close proximity to the magnetic layer on the disk causes the formation of the magnetic bits within the magnetic layer.

The continual quest for higher data recording densities of the magnetic media demands smaller magnetic data bit cells, in which the volume of recording material (grains) in the cells is decreased and/or the coercivity (Hc) is increased. When the bit cell size is sufficiently reduced, the problem of the superparamagnetic limit will provide a physical limit of the magnetic recording areal density. Present methods to delay the onset of this limit in storage media include the use of higher magnetic moment materials, and using thermally assisted recording (TAR) heads. An exemplary embodiment of the present invention relates to such thermally assisted recording heads in which a heating device is disposed within the magnetic head. Heat from the heating device temporarily reduces the localized coercivity of the magnetic media, such that the magnetic head is able to record data bits within the media. Once the disk returns to ambient temperature, the very high coercivity of the magnetic media provides the bit stability necessary for the recorded data disk.

In using optical energy for the heating of the magnetic medium, one needs to consider the applicability of the optics in near field, e.g., 1 to 20 nm from the source which resides in the magnetic head slider, and the heating of an area in the medium of very small dimensions, e.g., in the 20 to 30 nm range. Conventional diffraction limited optics is not applicable for heating such a small area. Such small spots can be produced in the near field of a subwavelength aperture. Significantly, the transmittance of a circular subwavelength aperture decreases as $(r/\lambda)^4$ where r is the radius of the aperture and $\lambda$ the wavelength of the optical waves. Thus the transmittance efficiency of a circular subwavelength aperture is very poor and high power lasers would be required to heat the medium. Recently, descriptions of several TAR methods for near-field heating of media have been published. In published U.S. patent application US2003/0184903 A1 and U.S. Pat. No. 6,944,101 special ridged waveguides are used as high transmission apertures disposed within the magnetic head and are taught for applications in perpendicular recording. These subwavelength apertures can produce a small spot in the near field with much higher through put than a simple circular aperture. In general the size of the heated spot depends on the optical wavelength and the dimensions and the composition of the materials for the waveguide/ridged waveguide.

Common to these prior art methods is that the heated spot is typically circular. In comparison therewith, a magnetic data bit of information in a magnetic medium typically has an elongated characteristic shape, such that its width (in the cross-track direction) can be a few times greater than the length of the data bit (in the down-track direction), and the aspect ratio, defined as (bit width)/(bit length), can be 3 or greater. Consequently, in TAR recording it will be beneficial to produce a heating spot that has approximately the same aspect ratio as the desired data bit.

An example of the present invention combines subwavelength apertures with an optical resonant cavity to amplify the intensity incident on the aperture and thus increase overall efficiency of transmitting light from the laser source to the medium. The coupling of power into the optical resonant cavity is by way of evanescent-wave coupling from an integrated waveguide. As a prior art example of this, R. W. Boyd et al., in Journal of Modern Optics, 2003, Vol. 50, No. 15-17, 2543-2550, "Nanofabrication of optical structures and devices for photonics and biophotonics" teaches a system consisting of a waveguide coupled to a resonant whispering gallery mode (WGM) cavity. In this technique a tapered planar waveguide is placed within a gap that is a fraction of a wavelength from a resonant microcavity.

SUMMARY OF THE INVENTION

A subwavelength aperture of the present invention includes a plurality of ridges that project from an aperture sidewall into the aperture opening. The ridges may be closely spaced such that the hot spots associated with the ridges are likewise closely spaced and create an elongated hot spot. The subwavelength aperture of the present invention may be adapted for use in a magnetic head of a hard disk drive for improved thermally assisted recording (TAR) of magnetic data bits.

An exemplary embodiment of a magnetic head of the present invention includes a media heating device that is fabricated within the magnetic head structure. The media heating device is preferably fabricated close to the air bearing surface of the head, where it serves to heat the magnetic media during or immediately prior to the passage of the magnetic media beneath the write gap of the magnetic head. The heating of the media lowers its localized coercivity, which facilitates the writing of data to the media by the write head element of the magnetic head.

An exemplary media heating device for a magnetic head of the present invention includes an optical resonant cavity that can produce a high intensity near-field optical beam of subwavelength dimension adjacent to the write pole that is appropriate for perpendicular recording at 1 Tbits/in$^2$ and beyond. Optical energy is coupled into the resonant cavity through a waveguide that is placed proximate the cavity, and optical energy is coupled out of the cavity through an opening that is placed proximate an antinode within the cavity. Optical energy from the cavity opening is directed to a subwavelength aperture of the present invention disposed between the resonant cavity and the air bearing surface. A subwavelength aperture of the present invention produces a predetermined aspect ratio of the heating spot "footprint". In a TAR magnetic head this facilitates the near-field optical heating in a spot shape having an aspect ratio that approximates the shape of magnetic data bits to be written upon the media.

It is an advantage of the subwavelength aperture of the present invention that it includes a plurality of ridges that project into the aperture opening.

It is another advantage of the subwavelength aperture of the present invention that it includes a plurality of ridges that are spaced closely together, such that hot spots associated with each of the ridges are likewise spaced closely together.

It is a further advantage of the subwavelength aperture of the present invention that it provides a plurality of closely spaced hot spots that merge into a single elongated hot spot.

It is yet another advantage of the subwavelength aperture of the present invention that it provides a single hot spot of elongated shape that may be predetermined in size.

It is an advantage of the magnetic head of the present invention that it includes an improved media heating element to facilitate the writing of data to a magnetic disk.

It is another advantage of the magnetic head of the present invention that it has a predetermined aspect ratio for the heated spot that can better conform to the aspect ratio of a magnetically written data bit.

It is a further advantage of the magnetic head of the present invention that it provides a heated spot that is scalable as bit density increases beyond 1 Tbits/in$^2$.

It is an advantage of the hard disk drive of the present invention that it includes a magnetic head having an improved media heating element, whereby higher data areal storage densities of the hard disk drive can be obtained.

It is another advantage of the hard disk drive of the present invention that it includes a magnetic head having an improved media heating element, whereby data storage disks having a higher coercivity can be written upon.

It is a further advantage of the hard disk drive of the present invention that it includes a magnetic head of the present invention for TAR recording that has a pre-determined aspect ratio for the heated spot that can better conform to the aspect ratio of a magnetically written data bit.

It is yet another advantage of the hard disk drive of the present invention that it includes a magnetic head having a heating element that provides a heated spot that is scalable as bit density increases beyond 1 Tbits/in$^2$.

These and other features and advantages of the present invention will no doubt become apparent to those skilled in the art upon reading the following detailed description which makes reference to the several figures of the drawing.

IN THE DRAWINGS

The following drawings are not made to scale as an actual device, and are provided for illustration of the invention described herein.

Figure 14E:
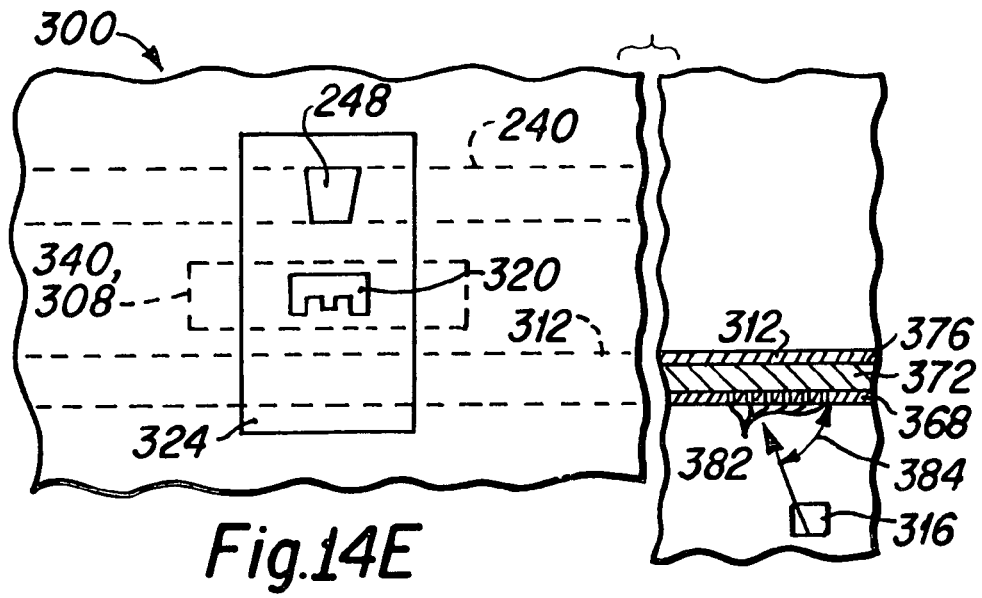
Figure 14F:
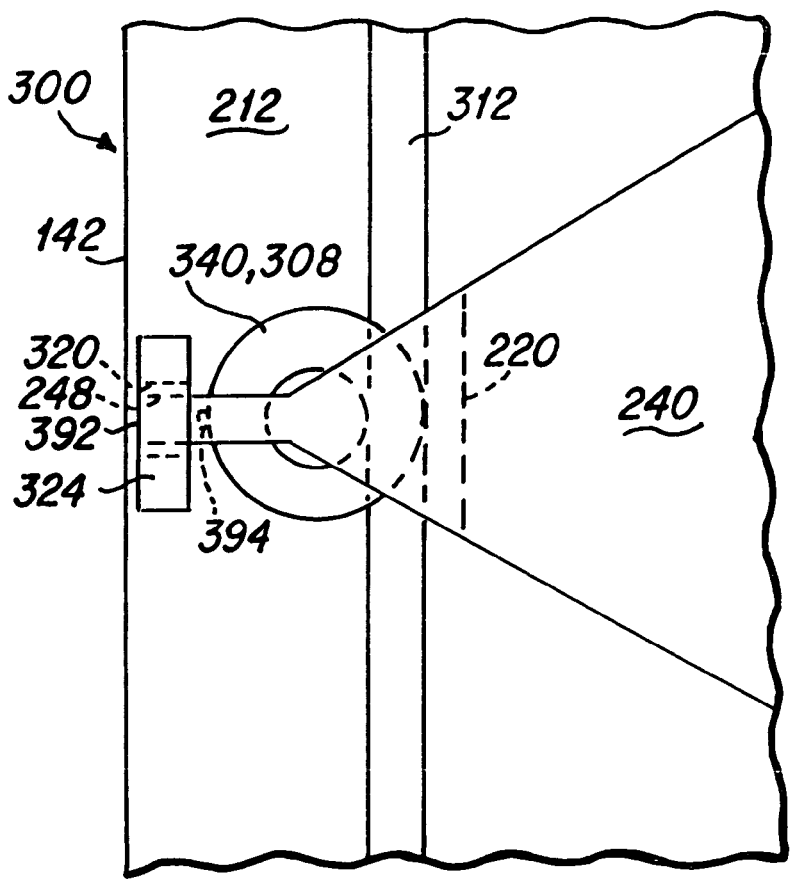

FIG. 13 is a diagrammatic representation of magnetic data bits in a data track of a magnetic hard disk; and FIGS. 14A, 14B, 14C, 14D, 14E and 14F depict an exemplary embodiment of a magnetic head of the present invention that includes an optical resonant cavity media heating device and a subwavelength aperture of the present invention, wherein FIG. 14A is a side cross-sectional view, FIG. 14B is a plan view taken from the ABS, FIG. 14C is a plan view taken from the downtrack side, FIG. 14D is an enlarged side cross-sectional view of the magnetic pole portion of the magnetic head depicted in FIG. 14A, FIG. 14E is an enlarged plan view of the pole portion of the magnetic head depicted in FIG. 14B, and FIG. 14F is an enlarged plan view of the pole tip portion of the magnetic head depicted in FIG. 14C.

DETAILED DESCRIPTION OF THE PREFERRED EMBODIMENTS

Figure 1:
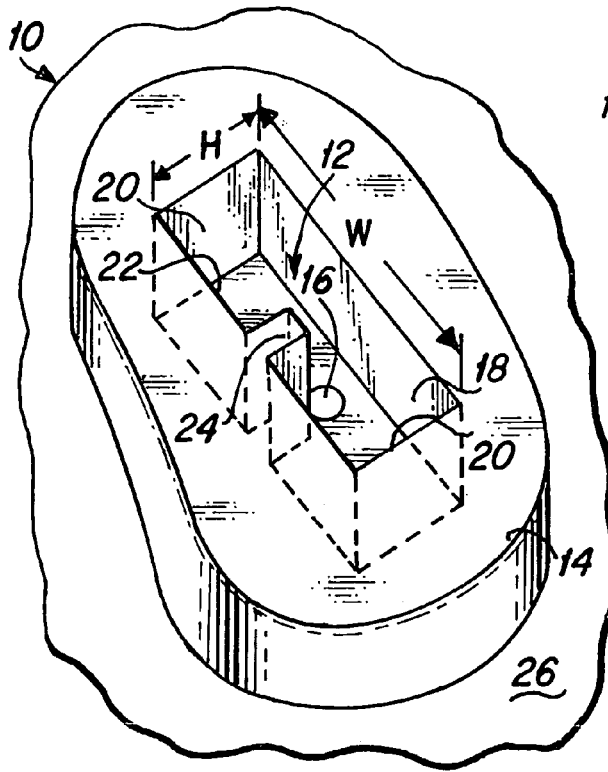
FIG. 1 is a perspective view of a prior art C-shaped subwavelength aperture.
Figure 2:
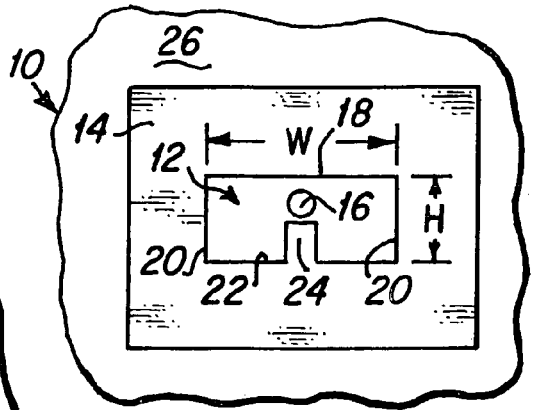
FIG. 2 is a plan view of the C-shaped subwavelength aperture depicted in FIG. 1.

A conventional prior art ridged aperture (also known as a C aperture), as shown in perspective view in FIG. 1 and plan view in FIG. 2, is a metallic, planar thin film structure 10 in which a C-shaped aperture 12 is formed through a metallic thin film 14. This metallic film can be any one of a number of preferably nonferrous metals such as silver, gold, aluminum, rhodium, platinum, chromium and others. When optical energy projects through the C aperture 12 it produces a single hot spot of subwavelength dimensions, heretofore described as a nano-hot spot 16, in the near field that is generally circular in shape. The C aperture 12 can be thought of as a generally rectangular, square or oval opening in the thin metal film 14 having a longer straight side 18, designated as its width (W), two shorter or equal straight sides 20 designated as its height (H), and a second longer straight side 22 that includes a single generally rectangular ridge 24 that projects from the side 22 into the opening towards the opposite longer side 18. As an example, for light having a wavelength of approximately 1 micron, the C aperture outline is approximately 180 nm wide (W)×80 nm high (H), with a ridge 24 that is approximately 20 nm wide (W)×40 nm high (H) in an aluminum film 14 sitting on silicon substrate 26. The aperture itself is filled with quartz, and the thickness of the film 14 is approximately 80 nm. Assuming the C aperture is illuminated from the substrate side with 1 micron radiation, a computed intensity profile of the C aperture 12 shows one generally circular hot spot 16 located at approximately 13 nm (in air) above (opposite the substrate) the C aperture, where the peak exit intensity is approximately 5.26× the incident intensity.

As is described below, the present invention includes a subwavelength aperture that produces a nano-hot spot where the shape of the spot is controlled to produce an elongated spot, having an aspect ratio that is selectable for differing applications. In an exemplary magnetic head for a hard disk drive, as described herein, the elongated hot spot shape is designed to more closely approximate the shape of the desired magnetic data bit.

Figure 3:
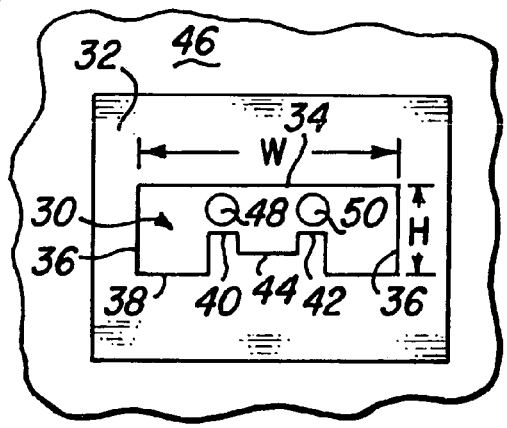
FIG. 3 is a plan view of a two-ridged E-shaped subwavelength aperture of the present invention.

A first exemplary subwavelength aperture 30 of the present invention is depicted in plan view in FIG. 3. This subwavelength aperture 30 can be desirably incorporated into a resonant cavity media heating device 300 of the present invention as is described herebelow. As seen in FIG. 3, the subwavelength aperture 30 has the appearance of the character "E" and is referred to herein as an E aperture. The E aperture 30 can be thought of as a generally circular, oval, rectangular or square opening in a thin metal film 32 having a longer axis 34 designated as its width (W), and a shorter or equal axis 36 designated as its height (H). Where the aperture is oval or rectangular, a longer side 38 includes two ridges 40 and 42 that each project from the side 38 into the opening towards the opposite longer side 34. This metallic film can be any one of a number of preferably nonferrous metals such as silver, gold, aluminum, rhodium, platinum, chromium and others.

The dimensions of a particular aperture are optimized for the materials used in the subwavelength aperture and the wavelength of optical energy that is directed therethrough. For a wavelength of approximately 1 micron, the exemplary subwavelength aperture outline of aperture 30 is approximately 140 nm W×60 nmH, with two ridges 40 and 42 that are approximately 10 nm W×35nm H, and a center gap 44 of approximately 30 nm W×20 nm H, in an approximately 80 nm thick gold film 32 sitting on a silicon substrate 46. The aperture 30 itself is filled with quartz. The computed intensity profile of the E aperture shows two distinct hot spots 48 and 50 at approximately 13 nm (in air) from the E aperture. The two hot spots have a peak exit intensity that is approximately 6 times the incident intensity. Significantly, if the spacing between the two ridges 40 and 42 of the E aperture 30 of FIG. 3 is reduced, such as from approximately 30 nm to approximately 10 nm, the two hot spots merge to form a single elongated spot, and such an E aperture is next described with the aid of FIG. 4.

Figure 4:
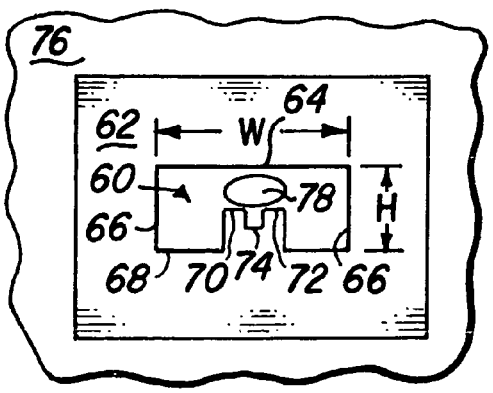
FIG. 4 is a plan view of another two-ridged E-shaped subwavelength aperture of the present invention.

A second exemplary subwavelength aperture 60 of the present invention is depicted in a plan view in FIG. 4. This subwavelength aperture 60 can also be desirably incorporated into a resonant cavity media heating device 300 of the present invention. As seen in FIG. 4, the subwavelength aperture 60 has two ridges and also has the appearance of the character "E". It is referred to herein as an E aperture. The E aperture 60 is quite similar to the E aperture 30; it may be thought of as a circular, oval, rectangular or square opening in a thin metal film 62 having a longer width (W) axis 64, and a shorter or equal height (H) axis 66. A longer side 68 includes two ridges 70 and 72 that project from the side 68 into the opening towards the opposite longer side 64. The significant difference between E aperture 60 and the E aperture 30 depicted in FIG. 3 is that the two ridges 70 and 72 of the E aperture 60 are spaced closer together than the two ridges 40 and 42 of the E aperture 30. This metallic film can be any one of a number of preferably nonferrous metals such as silver, gold, aluminum, rhodium, platinum, chromium and others.

For light having a wavelength of approximately 1 micron, the subwavelength aperture outline is approximately 140 nm W×60 nm H, with two ridges 70 and 72 that are approximately 10 nm W×35 nm H, and a center gap 74 of approximately 10 nm W×40 nm H, in an approximately 80 nm thick gold film 62 sitting on silicon substrate 76. The aperture 60 itself is filled with quartz. The computed intensity profile of the E aperture 60 shows an elongated hot spot 78 at approximately 13 nm (in air) from the E aperture 60. As shown in FIG. 4 the E aperture 60 forms the elongated hot spot 78 which is generally comprised of two closely placed hot spot areas from the two closely spaced ridges 70 and 72, and the elongated hot spot 78 is approximately 54 nm×35 nm in size, thus having an aspect ratio about 1.5. This illustrates the benefit of the E aperture 60 in producing an elongated single hot spot 78 that better conforms to the large aspect ratio of a written magnetic data bit of information in a magnetic disk as is described further below. As is next described, this aperture pattern can be extended to produce hot spots of still greater aspect ratio.

Figure 5:
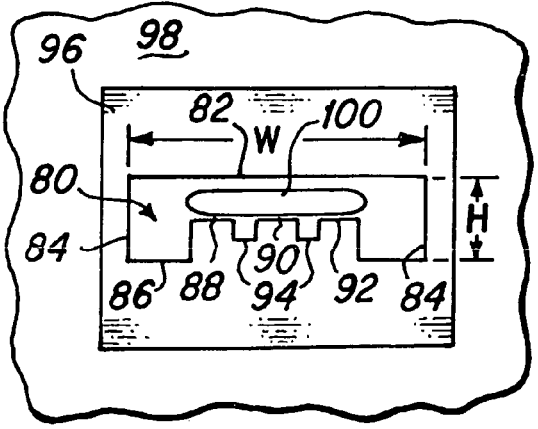
FIG. 5 is a plan view of a three-ridged subwavelength aperture of the present invention.

A further exemplary subwavelength aperture 80 of the present invention is depicted in a plan view in FIG. 5, where the subwavelength aperture 80 has three ridges. This subwavelength aperture 80 can also be desirably incorporated into a resonant cavity media heating device 300 of the present invention. As seen in FIG. 5, the subwavelength aperture 80 is a multi-ridged aperture. It can be thought of as a circular, oval, rectangle or square opening in a thin metal film 9 including a longer width (W) axis 82, and a shorter or equal height (H) axis 84. A longer side 86 has a plurality of ridges 88, 90 and 92 (three being shown by way of example) that project from the side 86 into the opening toward the opposite longer side 82. This metallic film can be any one of a number of preferably nonferrous metals such as silver, gold, aluminum, rhodium, platinum, chromium and others.

For light having a wavelength of approximately 1 micron, the subwavelength aperture outline is approximately 300 nm W×70 nm H, with three ridges 88, 90 and 92 that are each approximately 30 nm W×38 nm H, and a gap 94 between each of the ridges of approximately 20 nm W×60 nm H in an approximately 80 nm thick gold film 96 sitting on silicon substrate 98. The subwavelength aperture itself is filled with quartz. In this device the elongated hot spot 100 at approximately 13 nm (in air) from the subwavelength aperture is approximately 160 nm×45 nm, such that the aspect ratio for the hot spot is increased to approximately 3.6. This example demonstrates the potential for increasing the aspect ratio of the hot spot to an aspect ratio from approximately 1.5 to approximately 8 or greater by use of a subwavelength aperture 80 with multiridged aperture which may consist of two or three or more ridges and a desirable optimization of its dimensions.

While the exemplary subwavelength apertures depicted in FIGS. 2-5 are rectangular, a circular, oval or square aperture shape is also utilizable, and the aperture shape is thus not to be limited to rectangular shapes. Additionally, apertures having a plurality of ridges, and having ridges that project from longer, shorter or equal sides of the aperture are also utilizable. While the ridges are depicted as rectangular, they may also be rounded or otherwise shaped projections and the ridge shape is not to be limited to a generally rectangular shape. Generally, depending upon the light wavelength and other device parameters, the ridges can have width and height dimensions of from approximately 5 nm to approximately 100 nm, the spacing between the ridges and the opposite side of the aperture can be from 5 nm to 150 nm, and the gap distance between each of the ridges can range from approximately 5 nm to approximately 100 nm, as will be understood by those skilled in the art.

Figure 6:
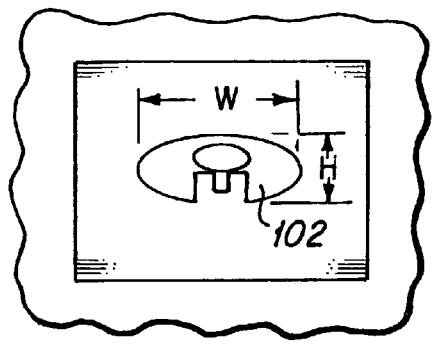
FIGS. 6-10 depict further subwavelength apertures of the present invention.
Figure 7:
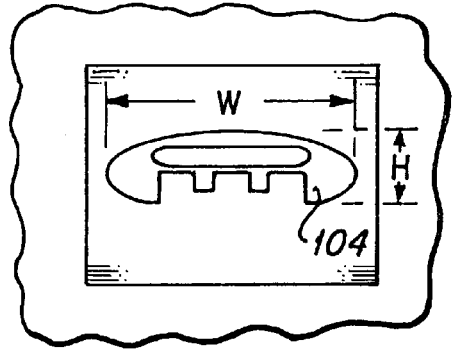
Figure 8:
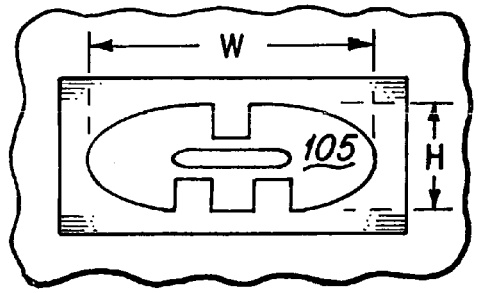
Figure 9:
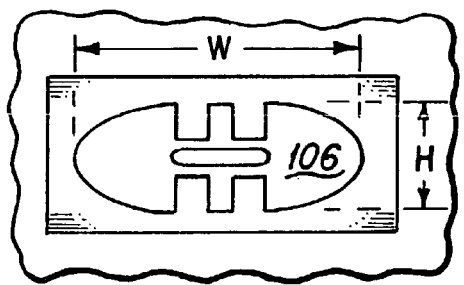
Figure 10:
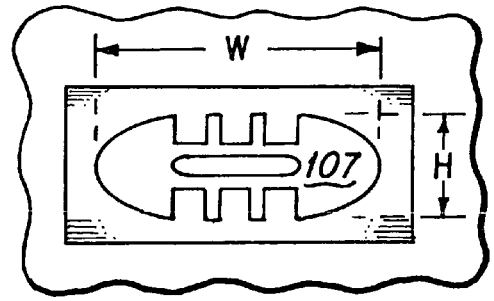

For instance, FIGS. 6-10 depict oval aperture embodiments that are suitable for use in the present invention. As depicted therein, FIG. 6 depicts an oval aperture 102 that is similar in optical effects to the E aperture of FIG. 4, and FIG. 7 depicts an oval aperture 104 having three ridges that is similar in optical effects to the rectangular aperture depicted in FIG. 5. Apertures 102 and 104 can be thought of as having first and second longer sides in which one or more ridges protrude from a first longer side towards an opposite second longer side of the aperture. FIGS. 8, 9 and 10 depict further aperture embodiments 105, 106, 107 respectively that consist of oval apertures having multiple ridges that project from both opposite sides of the aperture towards the middle. That is, embodiments 8, 9 and 10 include one or more ridges that project from a first side and one or more ridges that project from a second, opposite side of the aperture. Generally, depending upon the light wavelength and other device parameters, the ridges can have width and height dimensions of from approximately 5 nm to 100 approximately nm, the spacing between the ridges and the opposite side of the aperture can be from 5 nm to 150 nm, and the gap distance between the ridges on each side can be from approximately 5 nm to approximately 100 nm, as will be understood by those skilled in the art. These apertures are designed to produce the elongated hot spots having aspect ratios that more closely approximate the aspect ratio of the magnetic data bits that are written by the magnetic heads.

Figure 11:
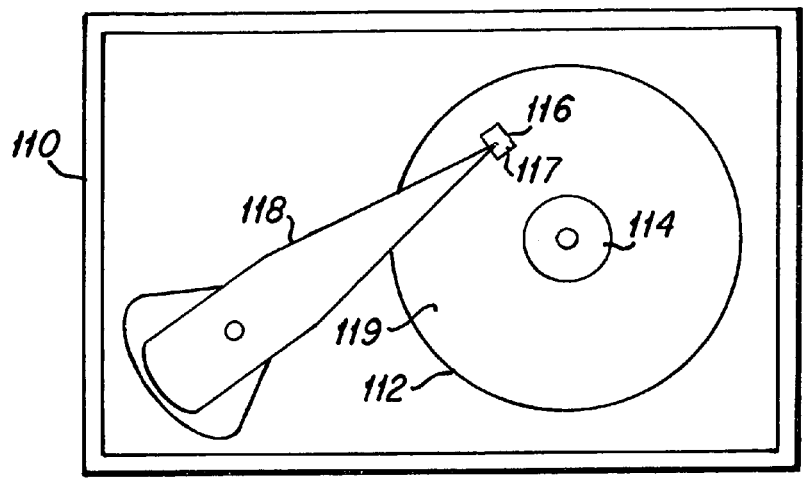
FIG. 11 is a schematic top plan view of a hard disk drive including a magnetic head of the present invention.

An exemplary magnetic head of the present invention includes a subwavelength aperture as described above and is utilized in a thermally assisted recording method to read and write data to magnetic media, such as a hard disk in a hard disk drive. A simplified top plan view of an exemplary hard disk drive 110 is presented in FIG. 11, wherein at least one magnetic media hard disk 112 is rotatably mounted upon a spindle 114. A magnetic head 116 of the present invention is formed upon a slider 117 that is mounted upon an actuator arm 118 to fly above the surface 119 of each rotating hard disk 112, as is well known to those skilled in the art. A typical hard disk drive 110 may include a plurality of disks 112 that are rotatably mounted upon the spindle 114, and a plurality of actuator arms 118, each having at least one slider 117 with a magnetic head 116 that is mounted upon the distal end of the actuator arms 118. As is well known to those skilled in the art, when the hard disk drive 110 is operated, the hard disk 112 rotates upon the spindle 114 and the slider acts as an air bearing in flying above the surface of the rotating disk. The slider 117 includes a substrate base upon which various layers and structures that form the magnetic head are fabricated. Such heads are fabricated in large quantities upon a wafer substrate and subsequently sliced into discrete magnetic heads 116.

Figure 12:
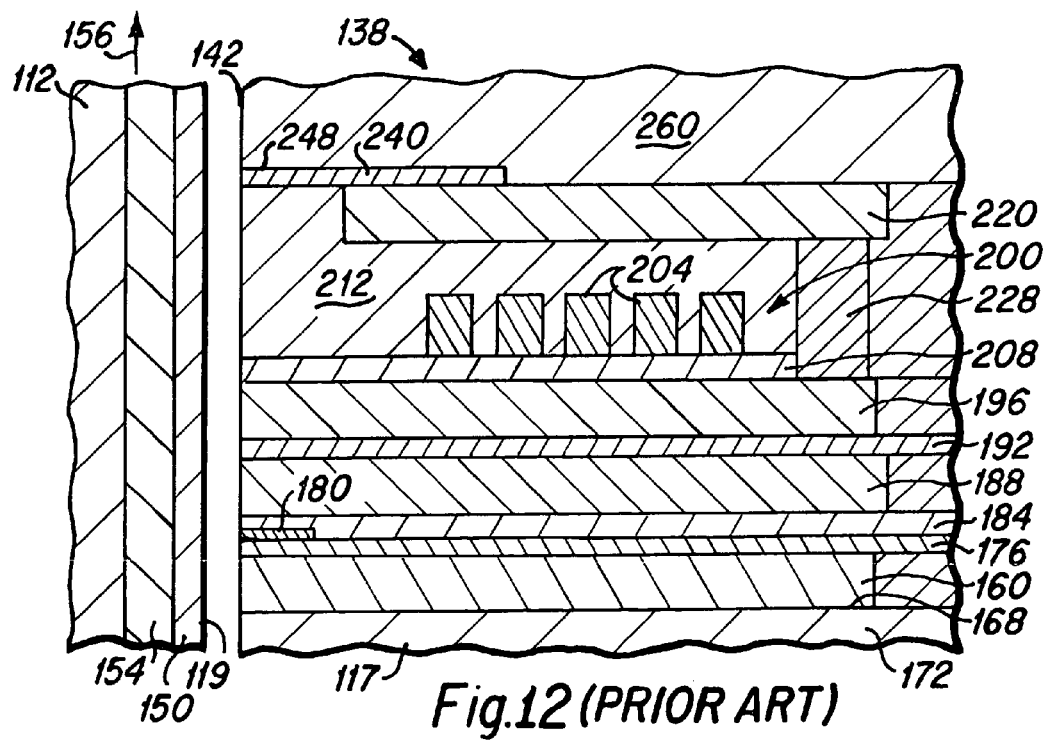
FIG. 12 is a side cross-sectional view depicting various components of a prior art perpendicular magnetic head.

FIG. 12 is a side cross-sectional diagram of a typical prior art perpendicular magnetic head 138 which serves as a basis for the description of an improved perpendicular magnetic head of the present invention which follows. As depicted in FIG. 12, a slider 117 having an air bearing surface (ABS) 142 is shown in a data writing position above the surface 119 of a hard disk 112. The disk 112 typically includes a high coercivity magnetic layer 150 that is fabricated on top of a magnetically soft underlayer 154. In FIG. 12, the disk 112 is moving towards the top (arrow 156) relative to the stationary slider 117.

The prior art perpendicular head 138 includes a first magnetic shield layer (S1) 160 that is formed upon the upper surface 168 of the slider substrate 172. A first insulation layer (G1) 176 is formed on the S1 shield 160 and a read head sensor element 180 is formed on the G1 layer 176. A second insulation layer (G2) 184 is formed on the sensor 180 and a second magnetic shield layer (S2) 188 is formed upon the G2 insulation layer 184. An electrical insulation layer 192 is then deposited upon the S2 shield 188, and a first magnetic pole (P1) 196 is fabricated upon the insulation layer 192. An induction coil structure 200 is fabricated upon the P1 pole 196, that includes induction coil turns 204 that are typically formed upon an electrical insulation layer 208 and within filling insulation 212. A second magnetic pole layer 220 typically termed a shaping layer or yoke 220, is fabricated on top of the induction coil structure 200. A magnetic back gap piece 228 joins the back portions of the P1 pole 196 and the shaping layer 220, such that magnetic flux can flow between them. A write pole probe layer 240 including a write pole tip 248 is next fabricated in magnetic flux communication with the shaping layer 220.

Following the fabrication of the probe layer 240, further magnetic head fabrication steps, such as the fabrication of electrical interconnects (not shown), are accomplished, as are well known to those skilled in the art, and the magnetic head is subsequently encapsulated, such as with the deposition of an alumina layer 260. Thereafter, the wafer is sliced into rows of magnetic heads, and the ABS surface 142 of the heads is carefully polished and lapped and the discrete magnetic heads 138 are ultimately formed.

As is well understood by those skilled in the art, electrical current flowing through the induction coil 204 will cause magnetic flux to flow through the magnetic poles of the head, where the direction of magnetic flux flow depends upon the direction of the electrical current through the induction coil. For instance, current in one direction will cause magnetic flux to flow through the shaping layer 220 through the narrow pole tip 248 into the high coercivity magnetic layer 150 of the hard disk 112. This magnetic flux causes magnetized data bits to be recorded in the high coercivity layer 150 as the disk moves past the magnetic head in direction 156, where the magnetization of the data bits is perpendicular to the surface 119 of the disk 112. As depicted in FIG. 13, a typical data track 504 that is written upon magnetic media includes a plurality of magnetic data bits 508 having a roughly rectangular shape, where the aspect ratio (width/length) is approximately 2 to approximately 6, depending upon the magnetic head design.

As indicated hereabove, to increase the areal data storage density of hard disk drives, the disks are fabricated with high coercivity magnetic media that can form and maintain smaller magnetic data bit cells. To write data to the high coercivity media it is helpful to include a media heating device within the magnetic head, such that the localized heating of the media reduces its coercivity and the magnetic head can then more easily and reliably write data bits into the heated magnetic media layer. Once the disk returns to ambient temperature the high coercivity of the magnetic media provides the bit stability necessary for the recorded data bit. It is desirable that the hot spot created by the media heating device be formed with an aspect ratio that more closely approximates the aspect ratio of the magnetic data bits. The novel subwavelength apertures of the present invention achieve such an elongated shaped hot spot having an aspect ratio which approximates the shape of the magnetic data bits. As is described hereinbelow, an exemplary magnetic head of the present invention includes a media heating device that includes a light transmitting device for providing optical energy to the subwavelength aperture. A brief discussion of such an optical system is next presented, including its implementation in an exemplary magnetic head embodiment of the present invention.

A resonant cavity optical system for an exemplary magnetic head of the present invention includes three separate elements which are designed to work together. The main component is a subwavelength aperture that is coupled to a resonant cavity that provides high optical fields to improve coupling efficiencies. A means for bringing light from a laser source into the resonant cavity is also required; this is preferably a waveguide having a tapered portion that is located close to the cavity in a manner to maximize coupling from the waveguide to the cavity. In this regard, a magnetic head of the present invention includes a subwavelength aperture of the present invention that produces a pre-selectable aspect ratio of the heating spot footprint. This nano-hot spot locally heats the recording medium, allowing the magnetic head to record a data bit.

In an exemplary magnetic head of the present invention the optical resonant cavity may be a circular cylindrical or ring structure, although it may also be a rectangular or photonic crystal structure. The ring structure, in particular, can be of an elongated shape to form a racetrack-shaped ring structure. The field inside these cavities can be enhanced over the field used to feed the cavity by a large factor equal to the Q, or quality factor of the cavity. Q values as high as $10^5$ or more have been demonstrated in simulations. The large field enhancement in the cavity means larger fields can be delivered to the subwavelength aperture and thus to the medium. The resonant cavity is created of a dielectric material that is shaped to the desired cavity dimensions and disposed within the magnetic head, where the dielectric material is non-absorbing at the optical wavelengths used to excite the cavity. For a wavelength in the 1-2 μm range, silicon (Si) can be used as the cavity material. Other materials that can be used, particularly at shorter wavelengths, include tantalum oxide ($Ta_2O_5$) and silicon nitride ($SiN_x$).

Light can be confined in the cavity by a number of well-known methods that all produce an interface that reflects the light. The simplest of these methods is an interface with a dielectric material of lower index of refraction as is used in step index optical fibers. Other methods are also available. For the purposes of this example, dielectric interfaces will generally be the preferred method although metal interfaces may be used on the top and/or bottom faces to help confine the field that is coupled out of the cavity into the recording medium.

The dimensions of the cavity are determined by the wavelength of the light in the material, the confinement method and the cavity mode being used. Depending on the mode within the cavity, the cavity diameter can range from subwavelength for a fundamental mode to a few wavelengths for higher order modes such as whispering gallery modes (WGM), where there are a string of maxima around the periphery of the cylinder. As is discussed in detail herebelow, in this example the cavity is built into the magnetic head with its axis parallel to the ABS and with a side edge of the cavity close to the ABS; the cavity is built as close to the write pole as possible on the up-track side of the pole.

Given a resonant cavity, mechanisms are required to bring light into the cavity and then again to couple light out of the cavity and into the recording medium. In general, a semiconductor laser will be used as the light source, and this example uses a waveguide to bring light from the source to the resonant cavity. Light from the laser can be coupled into the waveguide in a number of commonly known ways. If the laser and waveguide are on the same substrate, the laser can be directly butt-coupled into the waveguide with good efficiency. If not, a spot size reducer can be put on the end of the waveguide and the laser can be focused onto it, or a grating or prism coupler can be placed on the waveguide for coupling. When properly designed, all of these methods can have good coupling efficiency.

Finally it is required to couple the light out of the cavity and into the recording medium. Since the cavity has very high fields internally, any non-resonant aperture or perturbation placed on the cavity will result in good field strength outside the cavity. In the present invention, output coupling at a small localized area can be achieved by making a small diameter opening in the cavity. Introducing a perturbation will alter the cavity resonance slightly as will the presence of a subwavelength aperture and the recording medium in the near field of the cavity. These effects have to be taken into consideration in the design.

The light from the cavity opening is then coupled into a subwavelength aperture that produces intense optical fields confined to spot sizes on the order of 1/30 of the wavelength or less. The unique subwavelength apertures described herein have the feature of being able to produce nano-hot spots with controlled aspect ratios to match the data bit aspect ratio of the recording head or even two separate heating spots. A magnetic head embodiment 300 to illustrate the application of a subwavelength aperture together with a resonant cavity for thermally assisted magnetic recording is next discussed, where the embodiment may serve as the magnetic head 116 within the hard disk drive 110 of the present invention.

FIGS. 14A-14F depict an exemplary embodiment 300 of a magnetic head of the present invention that includes an optical resonant cavity media heating device 304, wherein FIG. 14A is a side cross-sectional view, FIG. 14B is a plan view taken from the ABS, FIG. 14C is a plan view taken from the downtrack side, FIG. 14D is an enlarged side cross-sectional view of the magnetic pole portion of the magnetic head depicted in FIG. 14A, FIG. 14E is an enlarged plan view of the pole portion of the magnetic head depicted in FIG. 14B, and FIG. 14F is an enlarged plan view of the pole tip portion of the magnetic head depicted in FIG. 14C.

As is best seen in FIGS. 14A, 14B and 14C, the magnetic head embodiment 300 includes a first magnetic shield layer 160, a read head sensor element 180 and a second magnetic shield layer 188, as well as the induction coil structure 200 including filling insulation 212, the shaping layer 220 and probe layer 240 that are similar to the structures depicted in FIG. 12 and described above, whereby they are correspondingly numbered for ease of comprehension.

The optical media heating device 304 of the present invention is preferably fabricated on the uptrack side of the probe layer 240 between the shaping layer 220 and the ABS 142; it includes an optical resonant cavity 308, a waveguide 312 for coupling optical energy from a laser source 316 to the cavity 308 and a subwavelength aperture 320 formed in a metal film 324 that is disposed at the ABS. As is best seen in the enlarged views of FIGS. 14D, 14E and 14F, the resonant cavity 308 is preferably though not necessarily fabricated as a ring shaped cavity 340 having a central axis 344 that is parallel to the ABS and a side edge 346 that is disposed close to the metal film 324. In a preferred embodiment, the ring shaped cavity 340 is fabricated with a bottom cladding layer 348 of relatively low index of refraction material, such as silicon dioxide ($SiO_2$), a central ring core 352 that is fabricated of a relatively high index of refraction material such as silicon, and a top cladding layer 356 that is fabricated of a relatively low index of refraction material such as $SiO_2$. As described hereabove, the ring cavity 340 may be sized to function as an optical resonant cavity in a fundamental mode or a WGM mode for the wavelength of light that is coupled into it.

The waveguide 312 is fabricated in close proximity to the cavity 340 and is spaced appropriately to couple light energy into the cavity. In the embodiment 300, the waveguide 312 is fabricated immediately uptrack from the cavity 340 and directed parallel to the ABS. In fabricating the magnetic head 300, the waveguide 312 is fabricated in a magnetic head plane that is created prior to and parallel to the plane in which the cavity 340 is fabricated. As with the cavity 340, the waveguide 312 is preferably fabricated with a bottom cladding layer 368 comprised of a relatively low index of refraction material such as $SiO_2$, a central core 372 that is comprised of a relatively high index of refraction material such as silicon, and a top cladding layer 376 that is comprised of a relatively low index of refraction material such as $SiO_2$.

Coupling the light source 316 such as a solid state diode laser to the waveguide 312 can be accomplished by one of several methods, where the source 316 generally is an integrated component of the magnetic slider 117. One coupling method is best seen in FIGS. 14C and 14E, in which a grating coupler consisting of grating lines 382 is formed on a cladding surface 368 or 376 (not shown) of the waveguide 312. The source 316 is appropriately focused and set at an angle of incidence 384 for best coupling. Alternatively, the light source 316 can be directly coupled into the end of the waveguide 312 away from the cavity. As is depicted in FIG. 14C, the waveguide 312 can be curved away from the ABS, such that the location of the grating coupler 382 can be several few hundred microns or more from the write pole, thus avoiding the crowding of components proximate the write pole tip 248.

As is best seen in FIG. 14D, the metal film 324 is fabricated between the outer side edge 346 of the cavity 340 and the ABS 142, and a subwavelength aperture 320 is fabricated through the thin metal film 324 directly opposite the side edge 346 of the cavity 340. The metal film 324 is preferably a nonferrous metal comprised of a material such as silver, gold, aluminum, rhodium, platinum, chromium and others, the film having a typical thickness of several tens of nanometers and thus being a fraction of a wavelength thick. The outer face 392 of the subwavelength aperture should be at or a few nanometers from the air bearing surface 142. The subwavelength aperture 320 thus acts to couple light energy from the resonant cavity 340 outward from the ABS to create a nano-hot spot on the magnetic media that is located immediately uptrack from the location of the magnetic pole tip 248 above the media. In FIG. 14E the subwavelength aperture 320 is depicted as an E-shaped opening such as E aperture 60 depicted in FIG. 4. The subwavelength aperture 320 can also have any other of the unique subwavelength aperture shapes of the present invention that are described hereabove. The output energy of the cavity 340, thus extends to and penetrates into the subwavelength aperture 320 to produce enhanced transmission and therefore thermal heating at the magnetic medium.

The apertures described in this invention can also be used in conjunction with other light delivery means in place of the resonant cavity devices described above. Examples of alternative approaches include those described in U.S. patent application publication US 2004/008591 A1.

In summary, this invention describes a multi-ridged subwavelength aperture for producing elongated heated spots in small localized areas, which is capable of enabling thermally assisted recording for 1 Tbits/in$^2$ and beyond. An application of the multi-ridged subwavelength aperture is the incorporation of such a uniquely shaped subwavelength aperture in a magnetic head embodiment as described hereabove to create an elongated shaped hot spot upon the magnetic media.

While the present invention has been shown and described with regard to certain preferred embodiments, it is to be understood that modifications in form and detail will no doubt be developed by those skilled in the art upon reviewing this disclosure. It is therefore intended that the following claims cover all such alterations and modifications that nevertheless include the true spirit and scope of the inventive features of the present invention.

The invention claimed is:

1. A subwavelength aperture for transmitting optical energy, comprising:
   a thin film of metallic material being disposed upon a substrate including an optically transparent material; an aperture of optical subwavelength dimensions being disposed within said thin film, and wherein at least two ridges project from a first side of said aperture into said aperture towards an oppositely disposed second side of said aperture.

2. A subwavelength aperture as described in claim 1 wherein said aperture has a shape that is selected from the group consisting of circular, oval, square and rectangular.

3. A subwavelength aperture as described in claim 1 wherein said aperture has a width axis that is longer than a height axis thereof, and wherein said first side of said aperture is longer than a side of said aperture extending between said first and second sides of said aperture.

4. A subwavelength aperture as described in claim 3 wherein two said ridges project from said first side, and wherein said two ridges are spaced apart from each other by a central gap distance of from approximately 5 nm to approximately 100 nm.

5. A subwavelength aperture as described in claim 4 wherein each of said two ridges is generally rectangular in shape.

6. A subwavelength aperture as described in claim 5 wherein said ridges are spaced apart from said oppositely disposed second longer side by a distance of from approximately 5 nm to approximately 150 nm.

7. A subwavelength aperture as described in claim 5 wherein said ridges have length and width dimensions of from approximately 5 nm to approximately 100 nm.

8. A subwavelength aperture as described in claim 3 wherein three said ridges project from said first side.

9. A subwavelength aperture as described in claim 8 wherein said ridges are spaced apart from each other by gap distances of from approximately 5 nm to approximately 100 nm.

10. A subwavelength aperture as described in claim 8 wherein each of said ridges is generally rectangular in shape.

11. A subwavelength aperture as described in claim 10 wherein said ridges are spaced apart from said oppositely disposed second longer side by a distance of from approximately 5 nm to approximately 150 nm.

12. A subwavelength aperture as described in claim 10 wherein said ridges have length and width dimensions of from approximately 5 nm to approximately 100 nm.

13. A subwavelength aperture as described in claim 1 wherein said thin film is comprised of a nonferrous metal.

14. A subwavelength aperture as described in claim 1 wherein said thin film is comprised of a metal taken from the group consisting of silver, gold, aluminum, rhodium, platinum and chromium.

15. A subwavelength aperture as described in claim 1 wherein said aperture is formed with an E shape.

16. A subwavelength aperture as described in claim 1 wherein at least one further ridge projects into said aperture from said second side.

17. A subwavelength aperture as described in claim 1 wherein at least two further ridges project into said aperture from said second side, and wherein said further ridges are spaced apart by gap distances of from approximately 5 nm to approximately 100 nm.

18. A magnetic head, comprising: a write head portion including a write pole tip and having an air bearing surface thereof; a light transmitting device being disposed proximate said write pole tip; a subwavelength aperture being disposed proximate said air bearing surface and said light transmitting device, whereby optical energy from said light transmitting device projects through said subwavelength aperture generally perpendicularly to said air bearing surface; and wherein said subwavelength aperture includes: a thin film of metallic material being disposed upon a substrate including an optically transparent material; an aperture of optical subwavelength dimensions being disposed within said thin film, and wherein at least two ridges project from a first side of said aperture into said aperture towards an oppositely disposed second side of said aperture.

19. A magnetic head as described in claim 18 wherein said aperture has a shape that is selected from the group consisting of circular, oval, square and rectangular.

20. A magnetic head as described in claim 18 wherein said aperture has a longer width axis and a shorter height axis, and wherein at least two ridges project from a first longer side of said aperture into said aperture towards an oppositely disposed second longer side of said aperture.

21. A magnetic head as described in claim 20 wherein two said ridges project from said first side and wherein said two ridges arc spaced apart by a central gap distance of from approximately 5 nm to approximately 100 nm.

22. A magnetic head as described in claim 21 wherein each of said two ridges is generally rectangular in shape.

23. A magnetic head as described in claim 20 wherein three said ridges project from said first side.

24. A magnetic head as described in claim 23 wherein said three ridges are spaced apart from each other by gap distances of from approximately 5 nm to approximately 100 nm.

25. A magnetic head as described in claim 18 wherein said thin film is comprised of a nonferrous metal.

26. A magnetic head as described in claim 18 wherein at least one further ridge projects into said aperture from said second side.

27. A magnetic head as described in claim 18 wherein at least two further ridges project into said aperture from said second side, and wherein said further ridges are spaced apart by gap distances of from approximately 5 nm to approximately 100 nm.

28. A magnetic head as described in claim 18 wherein said light transmitting device includes an optical waveguide being disposed proximate said write pole tip; and an optical energy source arid an optical energy transfer means to couple optical energy from the source to said optical waveguide.

29. A magnetic head as described in claim 18 wherein said subwavelength aperture provides a heating spot having dimensions on a magnetic disk medium that have approximately the same aspect ratio as data bits formed on said disk medium.

30. A hard disk drive, comprising: at least one hard disk being fabricated for rotary motion upon a disk drive; at least one magnetic head adapted to fly over said hard disk for writing data on said hard disk, said magnetic head including: a write head portion including a write pole tip and having an air bearing surface thereof; a light transmitting device being disposed proximate said write pole tip; a subwavelength aperture being disposed proximate said air bearing surface and said light transmitting device, whereby optical energy from said light transmitting device projects through said subwavelength aperture generally perpendicularly to said air bearing surface; and wherein said subwavelength aperture includes: a thin film of metallic material being disposed upon a substrate including an optically transparent material; an aperture of optical subwavelength dimensions being disposed within said thin film, and wherein at least two ridges project from a first side of said aperture into said aperture towards an oppositely disposed second side of said aperture.

31. A hard disk drive as described in claim 30 wherein said aperture has a shape that is selected from the group consisting of circular, oval, square and rectangular.

32. A hard disk drive as described in claim 30 wherein said aperture has a longer width axis and a shorter height axis, and wherein at least two ridges project from a first longer side of said aperture into said aperture towards an oppositely disposed second longer side of said aperture.

33. A hard disk drive as described in claim 30 wherein said thin film is comprised of a nonferrous metal.

34. A hard disk drive as described in claim 30 wherein at least one further ridge projects into said aperture from said second side.

35. A hard disk drive as described in claim 30 wherein said light transmitting device includes an optical resonant cavity being disposed proximate said write pole tip; and an optical energy source and an optical energy transfer means to couple optical energy from the source to said resonant cavity.

36. A hard disk drive as described in claim 30 wherein said subwavelength aperture provides a heating spot having aspect ratio and dimensions on a magnetic disk medium that are approximately the same as data bits formed on said disk medium.

* * * * *

UNITED STATES PATENT AND TRADEMARK OFFICE
CERTIFICATE OF CORRECTION

PATENT NO. : 7,649,677 B2 Page 1 of 1
APPLICATION NO. : 11/398170
DATED : January 19, 2010
INVENTOR(S) : Jin et al.

It is certified that error appears in the above-identified patent and that said Letters Patent is hereby corrected as shown below:

In the claims:
col. 13, line 14 replace "arc" with --are--;
col. 13, line 36 replace "arid" with --are--.

Signed and Sealed this

Twentieth Day of April, 2010

David J. Kappos
*Director of the United States Patent and Trademark Office*